United States Patent [19]

Henslee et al.

[11] Patent Number: 4,459,156
[45] Date of Patent: Jul. 10, 1984

[54] PHOSPHATE BONDING OF REACTIVE SPINELS FOR USE AS REFRACTORY MATERIALS

[75] Inventors: Walter W. Henslee, Lake Jackson; Greene W. Strother, Jr., Brazoria, both of Tex.

[73] Assignee: The Dow Chemical Company, Midland, Mich.

[21] Appl. No.: 451,351

[22] Filed: Dec. 20, 1982

[51] Int. Cl.³ ............................ C04B 9/04; C04B 35/44
[52] U.S. Cl. ........................................ 106/85; 501/111; 501/120; 501/153
[58] Field of Search ................... 106/85; 501/111, 120, 501/153

[56] References Cited

U.S. PATENT DOCUMENTS 3,730,744  5/1973  Yavorsky ........................... 106/85
3,885,978  5/1975  Doi et al. ........................... 106/85

*Primary Examiner*—James Poer
*Attorney, Agent, or Firm*—G. R. Baker

[57] ABSTRACT

A composition comprised of
I. 60 to 90% wt. of
  (a) from 70 to 95 weight percent of at least one of
    (i) one or more $MgAl_2O_4$ spinels heated at a temperature of about 600° C. to about 1700° C. and having less than 20% by weight of segregated phases of $Al_2O_3$ or MgO;
    (ii) $MgAl(OH)_{5-ny}X_y^n$ where $y \leq 1$; $x = OH^-$, halogen, $SO_4^=$, $NO_3^-$ carboxylate, halogenated carboxylate, $H_2PO_4^-$, $HPO_4^=$, $HCO_3^-$, and the like which is prepared by coprecipitating a Mg and Al salt under controlled pH and Mg/Al ratios and which may also include segregated phases of AlO(OH), $Mg(OH)_2$ and/or $Al(OH)_3$ following pH adjustment;
    (iii) intermediates of (1) and (2) prepared by partial calcination of (2) at temperatures $\geq 300°$ C. but $\leq 600°$ C.;
  (b) and from 5 to 30 weight percent of an aluminum, ammonium or alkali metal phosphate, polyphosphate, acid phosphates or their hydrates or a mixture of aluminum hydroxide or aluminum oxyhydroxide and phosphoric acid; and
II. from 10 to 35 weight percent water;
III. from 0 to 5 weight percent of modifiers selected from the group consisting of fumed $Al_2O_3$, glycerine, activated alumina, polyvinyl alcohol, MgO, $Mg(OH)_2$ or mixtures of two or more thereof.

Suitable for use in bonding particulate and/or shaped objects such as brick mortar, ramming compound, brick binder or the like.

3 Claims, No Drawings

PHOSPHATE BONDING OF REACTIVE SPINELS FOR USE AS REFRACTORY MATERIALS

CROSS REFERENCE TO RELATED APPLICATIONS

This application is related to application Ser. No. 184,189, filed Sept. 4, 1980, now abandoned; application Ser. No. 299,430, filed Sept. 4, 1981 (now abandoned); application Ser. No. 217,712, filed Dec. 18, 1980, now abandoned; application Ser. No. 298,048, filed Aug. 31, 1981 (now abandoned); application Ser. No. 296,605, filed Aug. 26, 1981; and application Ser. No. 183,909, filed Sept. 4, 1980, U.S. Pat. No. 4,382,997.

STATE OF THE ART

The following patents and literature references are deemed to represent art which is within the general field of $MgAl_2O_4$ spinels used in mortars, castables and coatings and the like employing phosphorous acids as a reactive component. U.S. Pat. No. 3,730,744, discloses aggregate cast shapes employing $Al(H_2PO_4)_3$ as the bonding solution which contains alkalizing ions as the curing agents; U.S. Pat. No. 3,285,755 teaches ammonium phosphate in combination with aluminum phosphate plus MgO (calcined dolomite). Spinel is mentioned as an aggregate.

A fundamental review of phosphate bonding is found in J. AMER. CERAMIC SOCIETY, Vol. 133, No. 8, Aug. 1, 1950 by William David Kingery. Another review is found in Ceramic Bulletin, Vol. 56, No. 7, page 640 by J. E. Cassidy (1977). Other studies are as follows: Vol 59, No. 7 (1980) by Francisco J. Gonzales and John W. Halloran, "Reaction of Orthophosphoric Acid with Several Forms of Aluminum Oxide" and an abstract of a Russian Scientific paper authored by L. B. Khoroshavin, V. A. Ryabin, I. E. Sipeiko, V. N. Naumov, G. A. Sychev, V. Ya. Pavlov, V. M. Chyrin, N. F. Serenko, B. V. Ponomarev, and E. P. Kosolapova; Eastern Institute of Refractories, Ural Scientific-Research Institute of Chemistry. Perm Chemical Plant. All-Union Scientific-Research Institute for the Power Supply in Nonferrous Metallurgy. This was translated from Ogneupory, No. 3, pp. 34–36, March, 1977.

The two review articles, the one by Kingery (covering the art to 1949) and the other by Cassidy (from 1949–1977) form a very complete picture of the state of technology on phosphate bonding. Materials listed as forming phosphate bonds with phosphoric acid are: $TiO_2$, CaO, FeO, $Fe_2O_3$, NiO, ZnO, $ZrO_2$, MgO, $Al_2O_3$, and $CrO_3$. These may be reacted as pure compounds or as constituents in mineral compositions, i.e., asbestos, bauxite or clay. The most common bonding mechanism using phosphoric acid is the reaction with alumina to form $Al(H_2PO_4)_3$. This is also the starting material in many formulations in place of $H_3PO_4$. $Al(H_2PO_4)_3$ further reacts with either alumina, clay or bauxite, resulting in orthophosphates ($MgHPO_4.3H_2O$ or $AlH_3(PO_4)_2$ as the bond.

In the $H_3PO_4 + Al_2O_3$ system addition of $Mg^2$, $Fe^3$ or $Be^2$ ions increase bonding strength but these ions also contribute to "premature" setting.

The patent literature very closely follows the above literature review, that is, while it teaches phosphate bonded systems, it only mentions spinel as one possible aggregate material. Also these aggregates are not "reactive" and are typically quite large (>10 microns).

The literature does not teach that bonding systems with various set properties can be made from "reactive" Mg-Al spinel by controlling particle size, chemistry of the precursor hydroxides and thermal treatments of the precursor phases and the spinel oxide produced from them. These variables permit preparation of products ranging from those containing complete hydroxyl functionality to those with mixed hydroxyl-"reactive" oxide functionality to "reactive" oxide functionality to dead burned (unreactive).

BRIEF DESCRIPTION OF THE INVENTION

In accordance with the present invention, effective compositions can be produced to bind as a mortar both porous and non-porous materials such as refractory brick, as a protective coating for such ceramic and non-ceramic shapes, fiber products, etc. The essential ingredients for producing the various compositions are (1) a reactive $MgAl_2O_4$ spinel, (2) aluminum phosphate or acid phosphate moieties including hydrates and polyphosphates, (3) water, (4) handling modifiers and (5) fillers.

The reactive $MgAl_2O_4$ spinel may and generally does include (1) $MgAl_2O_4$ heated at a temperature of from about 600° C. to about 1700° C. and likewise having less than about 20 percent segregated phases of $Al_2O_3$ and/or MgO;

(2) $MgAl(OH)_{5-ny}X_y^n$ where $y \leq 1$; $x = OH^-$, halogen, $SO_4^{--}$, $NO_3^-$ carboxylate, halogenated carboxylate, $H_2PO_4^-$, $HPO_4^{--}$, $HCO_3^-$, and the like which is prepared in the manner of copending application Ser. No. 299,430, filed Sept. 4, 1981 and application Ser. No. 184,189, filed Sept. 4, 1980 now abandoned, by Henslee et al, incorporated herein by reference and which may also include segregated phases of AlO(OH), $Mg(OH)_2$ and/or $Al(OH)_3$.

(3) Intermediates of (1) and (2) prepared by partial calcination of (2) at temperatures $\geq 300°$ C. but $\leq 600°$ C.

These three components constitute 70 to 95 percent of the weight of the binder portion of the compositions and, with the acid phosphate constitute the binder composition. The acidic phosphate component is selected from one or more of aluminum phosphate, aluminum polyphosphates, aluminum acid phosphate, hydrates of the same, and/or a mixture of aluminum hydroxide or aluminum oxyhydroxide and phosphoric acid. The latter components react in situ to form the meta phosphoric acid which reacts with the reactive sites of the various spinel and/or spinel precursor species aforedescribed. While aluminum has been set forth, it is to be understood that at present it is the preferred phosphate. Other phosphates, such as ammonium or the alkali metal phosphates, may also be employed although less advantageously as presently known. The binder portion of the mortar, constituting 60 to 90 weight percent of the total mortar composition, consists of 70 to 95 weight percent reactive spinel/precursor ($MgAl(OH)_{5-ny}X_y^n$) and 30 to 5 weight percent acid phosphate. Preferably the reactive spinel/precursor component consists of 0–80% by weight sintered spinel, 0–60% by weight calcined spinel and 0–30% precursor when combined with 30 to 5% by weight acid phosphate and 10 to 35% by weight water.

Water is employed as necessary to give workability and shrink resistance to the binder composition, as are handling agents. Total water content usually employed is from about 10 to about 35 weight percent of the total composition.

The handling and set modifiers investigated include activated alumina, fumed alumina ($Al_2O_3$), glycerine, polyvinyl alcohol, MgO, $Mg(OH)_2$ or mixtures of two or more, employed in from 0 to about 5 weight percent of the total composition. Other well known handling and set modifiers may be employed but have not been tested.

Depending upon the ultimate use to which the composition is to be put, various fillers, fibers, aggregates and the like may be added to give compression strengths and/or improve bond strength as obtained by incorporating these materials in conventional mortars, coatings, castables and the like. Refractory compositions containing fillers, aggregate, and/or fibers of refractory silicates, oxides, nitrides, carbides an the like may be formed by incorporating with said refractory components, at least 1% by weight of the compositions above described.

Formulations containing the aforedescribed components are hereafter set forth in tabular form to illustrate the variety of mixtures of those components within the scope of the present invention which produce excellent mortars, coatings and the like for ceramic bodies which are to be put into severe corrosive and/or temperature service.

It is to be understood that the compositions of this invention may, in addition to being the binder component for mortars and coatings, also be used in preparing ramming mixtures, gunning mixtures, and the like; or used as the binder system in pressed, extruded, or cast refractory shapes.

EXAMPLES

To facilitate comparisons, all values cited are given in approximate percentages of the final composition. All values have been calculated on a 100% basis of the compound cited.

| EXAMPLE # | 1 | 2 | 3 | 4 | 5 | 6 | 7 | 8 | 9 | 10 | 11 | 12 |
|---|---|---|---|---|---|---|---|---|---|---|---|---|
| Spinel >1600° C. | — | — | 32 | 31 | 27 | 74 | — | 36+ | — | — | — | 70+ |
| Spinel ~1500° C. | 30 | 29 | — | — | — | — | 63 | — | 31 | — | — | — |
| Spinel ~1300° C. | — | — | — | — | — | — | — | — | — | — | 33 | — |
| Spinel ~1100° C. | — | — | — | 10 | — | — | — | — | — | 20 | — | — |
| Spinel ~800° C. | — | — | — | — | — | — | — | — | — | — | — | 2.5 |
| Precursor ~500° C. | — | — | 4 | — | 2.5 | 2.5 | 2.5 | 2.3 | 2.5 | — | — | — |
| Precursor ~200° C. | — | — | — | — | — | — | — | — | — | 10 | — | — |
| α-$Al_2O_3$ (100–200 mesh) | 30 | 29 | — | — | — | — | — | — | — | 20 | 29 | — |
| α-$Al_2O_3$ (⅓ 60 mesh, ⅓ 120 mesh, ⅓ 320 mesh) | — | — | 32 | 31 | 48 | — | — | 35 | 31 | — | — | — |
| $Al(OH)_3$ | — | 9 | — | — | — | — | — | — | — | — | — | — |
| $Mg(OH)_2$ | — | — | — | — | — | — | — | — | — | — | — | — |
| MgO | — | — | — | — | — | — | — | — | — | — | — | — |
| $AlPO_4$ | 15 | — | — | — | — | — | — | — | — | — | — | — |
| $Al(H_2PO_4)_3$ | — | — | 12* | 9* | 9.5 | 8 | 9 | 7.6 | 11 | — | 11 | 10 |
| $H_3PO_4$ | 6 | 20 | — | — | — | — | — | — | — | 20 | — | — |
| $H_2O$ | 17 | 13 | 20 | 19 | 11 | 15 | 26 | 19 | 24 | 30 | 27 | 18 |
| Other | — | — | 2% fumed $Al_2O_3$ | — | 1% fumed $Al_2O_3$ | — | — | +commercial fused spinel | 1% fumed $Al_2O_3$ | — | — | — |
| HANDLING PROPERTIES | | | | | | | | | | | | |
| Workability | F | G | E | E | E | E | E | P | E | G | E | G |
| Slump Resistance | F | F | E | E | E | G | F | G | G | F | G | G |
| Shelf Life | G | E | G | E | G | F | G | P | G | G | E | G |
| SET PROPERTIES | | | | | | | | | | | | |
| Air set | F | F | E | G | E | E | G | E | G | F | G | G |
| Heat set (300°–1000° C.) | G | E | E | E | E | E | E | (too fast) | E | F | G | G |
| Strength | G | E | E | F | E | E | E | G | E | F | F | E |
| CHEMICAL RESISTANCE | E | E | E | G | E | E | E | P (acids) | E | F | — | — |

| EXAMPLE # | 13 | 14 | 15 | 16 | 17 | 18 | 19 | 20 | 21 |
|---|---|---|---|---|---|---|---|---|---|
| Spinel >1600° C. | 26 | 26 | 35 | — | — | 32 | 34 | 26 | — |
| Spinel ~1500° C. | — | — | — | 35 | 25 | — | — | — | 1.3 |
| Spinel ~1300° C. | — | — | — | — | — | — | — | — | 53 |
| Spinel ~1100° C. | — | — | — | — | — | — | — | — | — |
| Spinel ~800° C. | — | — | — | — | — | — | — | — | — |
| Precursor ~500° C. | — | — | — | 3.5 | 3 | 4.3 | — | — | 2.1 |
| Precursor ~200° C. | — | — | — | — | — | — | — | — | — |
| α-$Al_2O_3$ (100–200 mesh) | — | — | — | — | — | — | — | 26 | — |
| α-$Al_2O_3$ (⅓ 60 mesh, ⅓ 120 mesh, ⅓ 320 mesh) | 26 | 26 | 35 | 34 | 51 | 32 | 34 | — | — |
| $Al(OH)_3$ | 1.7 | 1.7 | 2.3 | — | — | — | — | 1.8 | — |
| $Mg(OH)_2$ | — | 4.9 | — | — | — | — | — | 3.4 | — |
| MgO | 4.9 | — | — | — | — | — | — | — | — |
| $AlPO_4$ | — | — | — | — | — | — | — | — | — |
| $Al(H_2PO_4)_3$ | 13.5* | 13.5* | 10* | 10* | 9* | 10* | 8* | 14* | 12.5 |

-continued
EXAMPLES

To facilitate comparisons, all values cited are given in approximate percentages of the final composition. All values have been calculated on a 100% basis of the compound cited.

| | | | | | | | | | |
|---|---|---|---|---|---|---|---|---|---|
| $H_3PO_4$ | — | — | — | — | — | — | — | — | — |
| $H_2O$ | 29 | 29 | 17 | 18 | 12 | 20 | 15 | 29 | 30 |
| Other | — | — | — | 1% fumed $Al_2O_3$ | — | 1% PVA | 4% act. $Al_2O_3$ | — | — |
| HANDLING PROPERTIES | | | | | | | | | |
| Workability | E | G | E | G | G | F | G | G | E |
| Slump Resistance | F | G | F | G | G | G | G | E | G |
| Shelf Life | F | F | G | — | G | — | — | F | G |
| SET PROPERTIES | | | | | | | | | |
| Air set | G | G | G | G | E | — | — | — | F |
| Heat set (300°–1000° C.) | — | — | — | E | E | — | — | — | F |
| Strength | — | — | — | — | E | — | — | — | F |
| CHEMICAL RESISTANCE | — | — | — | — | E | — | — | — | F |

*$Al(H_2PO_4)_3$ added as 55% wt. solution; otherwise added as a 47% wt. solution.

DETAILED DESCRIPTION OF THE INVENTION

In the following examples, unless otherwise denoted, the reactive $MgAl_2O_4$ spinel is derived from a coprecipitation process in which a mixture of magnesium aluminum hydroxides ($Mg_xAl_y(OH)_z$) and aluminum hydroxides and/or aluminum oxyhydroxides are produced. The magnesium aluminum hydroxide phase represented above may contain other anions partially substituting for hydroxide (e.g. $Cl^-$, $NO_3^-$, $SO_4^{--}$, $CO_3^{--}$), the presence and amount of which will be determined by the type of reactant salts used in the coprecipitation and the type and duration of subsequent treatments, chemical or thermal, to which the precipitate phase has been subjected. The precipitate of magnesium-aluminum and aluminum hydroxy compound is referred to as spinel precursor. The overall Al/Mg ratio with this mixture will be very nearly 2.0, unless otherwise noted. If this ratio significantly deviates from 2.0 (e.g. $<1.90$ or $<2.10$) segregated MgO and/or $Al_2O_3$ phases are normally observed in the calcined or sintered product and these can affect reactivity, as will be discussed.

The $Al(OH)_3$, $Al(H_2PO_4)_3$, $H_3PO_4$, fused grain $Al_2O_3$, fumed alumina, etc. are all commercially available, substantially pure compounds and/or solutions.

Most formulations will consist of two main parts. The binder phase is produced by reacting at least one acidic phosphate species with at least one hydroxide or oxide species. This is often carried out prior to the addition of the aggregate or filler material which latter component(s) may be inert, as in the case of fused grain $Al_2O_3$, or highly sintered ($\geq 1650°$ C.) $MgAl_2O_4$, or may have some degree of reactivity, as in the case of $MgAl_2O_4$ sintered to $\geq 1600°$ C. or calcined $Al_2O_3$. This is due to changes in surface area, degree of crystalline perfection and/or population of surface hydroxyls available for reaction.

EXAMPLE 1

In one example 2 gms. of $MgAl_2O_4$ (sintered to $\sim 1500°$ C.), 2 gms. of $Al_2O_3$ (100–200 mesh $\alpha$-$Al_2O_3$) 0.4 gm. of 85% $H_3PO_4$, 1 gm. of reagent grade $AlPO_4$ and 1.1 gms. of water were mixed well. Since amounts were small, no particular attention to order of mixing is necessary. Handling properties were fair, heat set properties excellent and strengths acceptable (333 psi bond strength between alumina tiles). This mortar was evaluated in a laboratory scale magnesium reduction cell and performed very well. The measure of performance is how much attack of the bond is observed when the mortar joint is placed between the anode and cathode.

EXAMPLE 2

In this example, 23 gms. of 85% $H_3PO_4$ are reacted with 9 gms. of reagent grade $Al(OH)_3$. The mixture is stirred until the $Al(OH)_3$ dissolves with evolution of heat. Then 9 gms. of water is added followed by 29 gms. of $MgAl_2O_4$ sintered to $\sim 1500°$ C. and ground to $\sim 200$ mesh. Last, 29 gms. of fused $Al_2O_3$ (120 mesh) is added. This formulation is somewhat runny for a mortar but makes a good coating for porous surfaces. It is quite strong and can withstand corrosive environments (HCl and steam at $>500°$ C.). Good shelf life ($>3$ mos.) was also observed. Bond strengths to silicon carbide brick were found to be $\sim 650$ psi after curing to 700° C.

This material was applied as a refractory cement to patch the cracks in the removable top of a kiln. This top was constructed of insulating firebrick and was exposed to repeated cycling up to 1100° C. and to HCl $>500°$ C. on occasion. The refractory brick had been coated once with a commercially available material but this coating had cracks and the insulating brick had begun to spall. The formulation of this example and one similar to that of example 3 were applied over the worst areas of spalling. This top was used for about an additional year when further spalling of the commercial patching material necessitated a completely new top. However, the areas patched with the coatings of this invention were in good condition.

This formulation can also be used to form the matrix of a refractory castable. For instance 75 gms. of the mixture whose composition is outlined above were mixed with 5 gms. of water and 20 gms. of dense spinel chips (8–12 mesh). The chips were obtained by crushing pressed and sintered spinel refractory shapes which were culls. These had been pressed at $\sim 8000$ psi from $MgAl_2O_4$ powder, derived from coprecipitated spinel precursor. This powder had been previously calcined to $\sim 1000°$ C. for $\sim 4$ hours and sieved through a 100 mesh screen. The pressed shapes were then thoroughly dried and sintered at 1500° C. for 10 hours.

The resulting castable was found to be somewhat porous but very strong. The porosity is thought to be due to decomposition of excess $H_3PO_4$ in the formulation.

EXAMPLE 3

In this case 2 gms. of spinel precursor which had been calcined to 500° C. was stirred into 10.5 gms. of a 55% wt. solution of $Al(H_2PO_4)_3$. After about 15 minutes 15 gms. of $MgAl_2O_4$ which had been sintered to about 1600° C. was added, along with 15 gms. of fused $Al_2O_3$ (⅛ 60 mesh, ⅜ 120 mesh, ½ 320 mesh) and 5 gms. of water. One gm. of fumed alumina was added to the mixture to improve handling properties whereupon workability and slump resistance were rated good by brickmasons. This formulation was used to mortar high density alumina tiles for an accelerated test in a lab scale magnesium reduction cell. Failure of the mortar joint did not occur until 254 hrs., with a very narrow attack zone (1–3 mm) indicating excellent service characteristics.

EXAMPLE 4

In another example 45.2 gms. of $MgAl_2O_4$ calcined to about 1100° C. were mixed with 69.3 gms. of a 55% by wt. $Al(H_2PO_4)_3$ solution. After about 30 minutes 135 gms. of $Al_2O_3$ (⅛ 60 mesh, ⅜ 120 mesh, ½ 320 mesh) was added. The 135 gms. of sintered (~1500° C.) $MgAl_2O_4$ (ground to about 200 mesh) were added with 53 gms. of water. All components were thoroughly mixed. The handling properties of this formulation are excellent both from the standpoint of workability and slump resistance. In some ways the effect is similar to that observed when fumed alumina is added to a formulation like example 3. Bond strengths are adequate (>200 psi) at both air set and heat set (300°–700° C.).

EXAMPLE 5

In this example the method of mixing was slightly altered. The $MgAl_2O_4$ which had been calcined to 500° C. was milled with a small amt. of $MgAl_2O_4$ which had been sintered to ~1600° C. The amounts were 13.3 lbs. and 6.6 lbs., respectively. These solids (100–200 mesh) were stirred into 18.8 lbs. of water. 92.2 lbs. of a 47% by wt. solution of $Al(H_2PO_4)_3$ were then added to the slurry with stirring. This methodology was adopted to avoid the formation of lumps in large batches. After about 30 min. 252 lbs. of fused $Al_2O_3$ (⅛ 60 mesh, ⅜ 120 mesh, ½ 320 mesh) was added followed by 143 lbs. of $MgAl_2O_4$ sintered to ~1600° C. This produced a satisfactory mortar with bond strengths of several hundred psi. This formulation also produces a tough, adherent, corrosion resistant coating when applied to the surface of dense refractory shapes. A variation of this formulation is an excellent protective coating for porous refractory shapes, castables or fiberboard (see example 9).

EXAMPLE 6

In this example, a quantity of $MgAl_2O_4$ which had been calcined to 500° C. was milled for about 2 hrs. with one-half as much $MgAl_2O_4$ which had been sintered to >1500° C. The milled mixture was passed through a 40 mesh screen, but actual size was probably 100–200 mesh. Water (0.89 lb.) and 0.52 lb. of the milled mixture were slurried with 2.55 lbs. of a 47% by wt solution of $Al(H_2PO_4)_3$. After a few minutes 11.04 lbs of $MgAl_2O_4$ sintered to ~1600° C. and ground to >100 mesh was added followed by 4 gms. of additional water. This gave a final water content of ~14.5% and a phosphate level of 7.2%. This formulation has creamy smooth texture and air-sets somewhat faster than the formulation of example 5. Workability is excellent and bond strengths to magnesia chrome aggregate refractories were found to be 400–800 psi.

EXAMPLE 7

A variation of example 6 was prepared for coating commercial fiberboard used in handling molten non-ferrous metals such as aluminum. The formulation of example 6 was altered such that water content was increased to ~25%, phosphate levels were raised to 9.0% and sintered MgAl spinel content was reduced to ~65%. These changes were found necessary to provide sufficient working time to paint or trowel the coating onto a porous surface. It was also found advantageous to use some coarse spinel fired to >1600° C. (20–50% being ~40 mesh) to prevent mud cracks in the coating. The coated component could then be dried and baked to ≧350° C. and used in molten non-ferrous metal service.

If the phosphate level is increased further (10–11%) and the water reduced this formulation yields an excellent matrix for a refractory castable.

EXAMPLE 8

In this case an attempt was made to substitute a commercially available fused grain spinel for part of our coprecipitated material. The method used in example 5 was followed in which a quantity of stoichiometric $MgAl_2O_4$, made by coprecipitation and calcined to 500° C., was milled with one half as much sintered spinel, in this case the commercial fused grain material. The so milled mixture was screened (<100 mesh) and 3.7 gms. slurried with 3.1 gms. of $H_2O$. A quantity (17.4 gms.) of the $Al(H_2PO_4)_3$ solution (47% by wt.) was added with stirring. After a few minutes 37.5 gms. of fused alumina (⅛ 60 mesh, ⅜ 120 mesh, ½ 320 mesh) was added followed by an equal amount of ground (~100 mesh) fused grain spinel from a commercial supplier. Final viscosity was adjusted by adding 8.2 g of $H_2O$.

This produces a mix which hardens quite rapidly within minutes. We believe that this lack of working time is due to the segregated MgO phase, observed by x-ray diffraction in the commercial fused grain material. Even treatment of the fused grain in 1:1 HCl(6N) for ~12 hours to remove some of the MgO failed to significantly improve working time. The same formulation using our coprecipitated $MgAl_2O_4$ for the entire spinel component exhibits excellent workability and shelf life.

EXAMPLE 9

In this case 3 lbs. of $MgAl_2O_4$ which had been calcined at 500° C. for 2 hours (from coprecipitated precursor hydroxides) and 2 lbs. of similarly treated $MgAl_2O_4$ which had been previously sintered to 1500° C. for 10 hours were ball milled and both were sieved through a 100 mesh screen. These powders were added to 24 lbs. of a 47% by wt. solution of $Al(H_2PO_4)_3$ and 18 lbs. of water. After about 15 minutes 37 lbs. of fused grain alumina (½ 320 mesh, ½ 120 mesh) were added followed by 36 lbs. of sintered $MgAl_2O_4$ as described above. Last, 1.2 lbs. of fumed $Al_2O_3$ was added as a handling modifier.

The resulting mix makes an excellent coating which, with minor adjustments to the water, phosphate and/or fumed alumina content, can be trowelled or painted onto porous refractory products such as firebrick, insulating fiberboard, castables, and the like. When dried to remove the water and cured to about 350° C., a tough, adherent coating is formed which is resistant to abrasion and attack by hot acids, bases and molten metals (e.g. Al, brass, Cu, Mg, etc.).

The fused $Al_2O_3$ in this case is inert filler and it is believed that any other inert filler, resistant to the particular attacking agents in a given service could be substituted. For example, we have substituted hard fired $MgAl_2O_4$ ($\cong 1650°$ C.) of about the same mesh sizes as the alumina employed above. If $MgAl_2O_4$ fired to lower temperatures, or $MgAl_2O_4$ which is impure (e.g. containing MgO) is substituted, handling and set properties of the coating were found to be inferior when applied to porous fiberboard products and castables. For example, severe mud cracking upon curing was common and workability was inferior.

EXAMPLE 10

In this instance the MgAl and Al precursor hydroxides were used as the basic part of the binder and were reacted with the acid phosphate as follows: 1 gm. of the coprecipitated hydroxide precursor dried at 200° C. was ground to a fine powder and mixed with 2 gms. of 85% $H_3PO_4$. Two gms. of a slightly Al rich spinel preparation Al/Mg=2.12, which had been calcined at 1200° C., were added along with 2 gms. of pure $\alpha$-$Al_2O_3$ (100–200 mesh) and 3 gms. of water.

A thin layer mortar was applied to high density alumina tiles and the joined pieces dried at 100° C. After about 1 hour a good air set had developed. The sample was cured to 700° C. and tested in a lab scale magnesium reduction cell. Although not the best mortar developed, performance was comparable to most of the commercially available mortars tested.

EXAMPLE 11

In this example 21 lbs. of coprecipitated spinel precursor calcined to 1300° C. and milled to ~200 mesh was stirred into 12 lbs. of 47% wt. $Al(H_2PO_4)_3$ solution with 9 lbs. of water. Eighteen lbs. of 120 mesh fused $Al_2O_3$ was then added. This formulation handled well but was somewhat weak in strength. Another 3 lbs. of $Al(H_2PO_4)_3$ solution was added and acceptable strength attained for use as a sacrificial wash coating on other refractory products. We found it easy to apply with a brush, roller or trowel.

EXAMPLE 12

It was noted that when spinel preparations rich in Mg were used for the filler, especially such as the commercially available fusion cast spinels, the set properties were significantly altered. Shelf life was typically very short, often with the sample setting up in its container in less than 30 minutes. This was true even if our stoichiometric spinel was used in the binder. This is due to the presence of segregated MgO.

To produce a workable formulation from such spinel powder, it is best to reduce the reactivity of the spinel in the binder phase by increasing the calcination temperature from 500° C. to 800°–1000° C. For example, 2.5 gms. of coprecipitated spinel precursor calcined to 800° C. and 1.5 gms. of a commercially available fusion cast spinel ground to ~40 mesh were reacted with 20 gms. of a 47% by wt. solution of $Al(H_2PO_4)_3$. 68 gms. of the ground fusion cast spinel and 8.0 gms. of water were then added and mixed. This formulation was applied to high density alumina tiles and was found to yield a good air set and a strong, hard heat set at 350° C. It could also be used as a refractory castable.

We claim:

1. A composition comprised of
   I. 60 to 90% wt. of
      (a) from 70 to 95 weight percent of at least one of
         (i) one or more $MgAl_2O_4$ spinels heated at a temperature of about 600° C. to about 1700° C. and having less than 20% by weight of segregated phases of $Al_2O_3$ or MgO;
         (ii) $MgAl(OH)_{5-ny}X_y{}^n$ where $y \leq 1$; $x=OH^-$, halogen, $SO_4{}^{--}$, $NO_3{}^-$ carboxylate, halogenated carboxylate, $H_2PO_4{}^-$, $HPO_4{}^{--}$, $HCO_3{}^-$, and the like which is prepared by coprecipitating a Mg and Al salt under controlled pH and Mg/Al ratios and which may also include segregated phases of AlO(OH), $Mg(OH)_2$ and/or $Al(OH)_3$ following pH adjustment;
         (iii) intermediates of (1) and (2) prepared by partial calcination of (2) at temperatures $\geq 300°$ C. but $\leq 600°$ C.;
      (b) and from 5 to 30 weight percent of an aluminum, ammonium or alkali metal phosphate, polyphosphate, acid phosphates or their hydrates or a mixture of aluminum hydroxide or aluminum oxyhydroxide and phosphoric acid; and
   II. from 10 to 35 weight percent water;
   III. from 0 to 5 weight percent of handling and set modifiers selected from the group consisting of fumed $Al_2O_3$, glycerine, activated alumina, polyvinyl alcohol, MgO, $Mg(OH)_2$ or mixtures of two or more thereof.

2. A composition comprised of
   (a) 0–80% by weight of a $MgAl_2O_4$ sintered at a temperature of at least 1500° C. and having less than 20% segregated phases of $Al_2O_3$ and/or MgO;
   (b) 0–60% by weight of a $MgAl_2O_4$ calcined at a temperature of at least 400° C. but less than 1500° C.;
   (c) 0–30% $MgAl(OH)_{5-ny}X_y{}^n$ where $y \leq 1$; $x=OH^-$, halogen, $SO_4{}^{--}$, $NO_3{}^-$ carboxylate, halogenated carboxylate, $H_2PO_4{}^-$, $HPO_4{}^{--}$, $HCO_3{}^-$, and the like which may also include segregated phases of AlO(OH), $Mg(OH)_2$ and/or $Al(OH)_3$;
   (d) said aforesaid components being present singularly or in combination to provide about 35 to 85% by weight of said total weight of the composition;
   (e) water from 10 to 35%;
   (f) 30% to 5% aluminum, ammonium or alkali metal phosphate, polyphosphate, acid phosphates or their hydrates or a mixture of phosphoric acid and aluminum hydroxide.

3. A refractory composition comprised of at least 1% by weight of the composition of claim 1 and the remainder selected from fillers, aggregate, fibers, comprised of refractory silicates, oxides, nitrides and/or carbides.

* * * * *